United States Patent
Callahan et al.

(10) Patent No.: US 6,602,593 B1
(45) Date of Patent: Aug. 5, 2003

(54) BATTERY SEPARATORS WITH REDUCED SPLITTING PROPENSITY

(75) Inventors: Robert W. Callahan, Charlotte, NC (US); Ron W. Call, Rock Hill, SC (US); Ken J. Harleson, Fort Mill, SC (US); Ta-Hua Yu, Dover, DE (US)

(73) Assignee: Celgard Inc., Charlotte, NC (US)

( * ) Notice: Subject to any disclaimer, the term of this patent is extended or adjusted under 35 U.S.C. 154(b) by 0 days.

(21) Appl. No.: 09/385,933

(22) Filed: Aug. 30, 1999

(51) Int. Cl.⁷ .............. B32B 3/26; H01M 2/16
(52) U.S. Cl. .............. 428/316.6; 428/304.4; 428/315.5; 428/315.9; 429/254
(58) Field of Search ............ 428/315.5, 315.9, 428/316.6; 429/254

(56) References Cited

U.S. PATENT DOCUMENTS

| | | | |
|---|---|---|---|
| 4,118,453 A | 10/1978 | Herrington | 264/89 |
| 4,650,730 A | 3/1987 | Lundquist et al. | 429/62 |
| 4,731,304 A | 3/1988 | Lundquist et al. | 429/62 |
| 5,212,009 A | * 5/1993 | Peiffer et al. | 428/220 |
| 5,240,655 A | 8/1993 | Troffkin et al. | 264/28 |
| 5,281,491 A | 1/1994 | Rein et al. | 429/62 |
| 5,565,281 A | 10/1996 | Yu et al. | 429/62 |
| 5,635,262 A | * 6/1997 | Best et al. | 428/36.92 |
| 5,667,911 A | 9/1997 | Yu et al. | 429/144 |
| 5,691,077 A | 11/1997 | Yu | 429/62 |

FOREIGN PATENT DOCUMENTS

| | | |
|---|---|---|
| EP | 0 767 200 | 4/1997 |
| EP | 0 924 780 | 6/1999 |
| EP | 0 967 671 | 12/1999 |
| GB | 2298817 A | 2/1996 |
| JP | 7-304110 A | 11/1995 |
| JP | 8-250097 | 9/1996 |
| WO | WO 99/36978 | 7/1999 |

* cited by examiner

*Primary Examiner*—Terrel Morris
*Assistant Examiner*—Kai Vo
(74) *Attorney, Agent, or Firm*—Robert H. Hammer, III, P.C.

(57) ABSTRACT

A split resistant microporous membrane is provided for use in preparing a battery separator. The microporous membrane has a TD tensile strength to MD tensile strength ratio of from about 0.12 to about 1.2, preferably from about 0.5 to about 1. The microporous membrane is made by a process which includes the steps of preparing a film precursor by blown film extrusion at a blow-up ratio of at least 1.5, annealing the film precursor, and stretching the resultant annealed film precursor to form the microporous membrane.

20 Claims, No Drawings

BATTERY SEPARATORS WITH REDUCED SPLITTING PROPENSITY

FIELD OF THE INVENTION

This invention relates to battery separators, in particular to a battery separator with reduced splitting propensity and method of making same.

BACKGROUND OF THE INVENTION

Microporous film battery separators are used in various batteries, particularly rechargeable batteries, such as lithium batteries. Such battery separators allow electrolytes to cross through the battery separator while preventing any contact between electrodes of opposite polarity. Typically, the microporous film comprises one or more layers of microporous membranes.

In lithium batteries, particularly secondary lithium batteries, overheating problems can occur and cause thermal runaway in the battery. Thus, shutdown separators, including mono-layer shutdown separators and multi-layer separators, were developed to prevent thermal runaway. See e.g., U.S. Pat. No. 4,650,730 and U.S. Pat. No. 4,731,304. A shutdown battery separator has a microporous membrane that closes its pores at a temperature substantially lower than the temperature that could cause thermal runaway in the lithium battery. Multi-layer shutdown separators are known in the art and have been disclosed in, e.g., U.S. Pat. Nos. 5,565,281 and 5,691,077, Japanese Patent Application Nos. JP7-304110A and JP8-250097A, and UK Patent Publication No. GB 2,298,817. Typically, multi-layer shutdown separators comprise one or more shutdown layers and at least one strength layer. The shutdown layer or layers are capable of melting and filling the pores at a temperature (shutdown temperature) below the melting point of the strength layers. As a result, when the micropores are eliminated in the shutdown layers at the shutdown temperature, the strength layers retain substantially their dimensional stability and thus maintain the integrity of the separator in the event of short circuit and prevent the ion flow between the electrodes.

A microporous shutdown separator should be thin in order to minimize the space it occupies in the battery and also to reduce electrolytic resistance. Nevertheless the shutdown separator must also have sufficient strength to resist puncture. One problem often encountered with thin battery separators known in the art is that they are prone to splitting, i.e., tearing as a result of puncture. This creates difficulties in handling the separators especially in the battery separator manufacturing processes. Torn separators are not only defective in preventing direct contact of electrodes and thus are ineffective in preventing thermal runaway. Thus, there is great need in the art to develop split resistant battery separators.

SUMMARY OF THE INVENTION

The present invention provides a split resistant microporous membrane for use in preparing a battery separator. The microporous membrane is made by a process which includes the steps of preparing a film precursor by a blown film extrusion process at a blow-up ratio of at least 1.5, annealing the film precursor, and stretching the resultant annealed film precursor to form the microporous membrane.

Generally, in a blown film extrusion process, the polymer film precursor exhibits a crystalline row structure in which lamellae are arranged in rows with their long axis perpendicular to the take-off direction (machine direction or MD). Such a crystalline structure is important to the formation of micropores in the subsequent annealing and stretching steps. Although it has been generally believed that expansion of a blown film in the transverse direction would disrupt such a crystalline structure and interfere with the micropore formation in the subsequent stretching step, it has now been found that even when the extruded film precursor is greatly oriented in the transverse direction (TD) as a result of the increase in blow-up ratio, the resultant film precursor is still suitable for subsequent annealing and stretching operations and micropores can be formed.

It has been discovered that when the blow-up ratio used in the extrusion process is at least 1.5, the microporous film exhibits improved split resistance. As the blow-up ratio increases, a blown film is increasingly oriented in the transverse direction (TD), i.e., the direction perpendicular to the machine direction (MD). As a result, the tensile strength in the transverse direction of the blown film is increased. In accordance with the present invention, a microporous film precursor for use in a battery separator is typically substantially oriented in the machine direction. Thus, as the blow-up ratio increases, the difference between the tensile strength in the transverse direction and the machine direction is reduced even in absence of an extra stretching step in the transverse direction. As a result, the resultant microporous film is less prone to split.

The microporous film of this invention exhibits significantly improved split resistance while still possessing other mechanical properties desired for battery separators.

Typically, the microporous film of this invention is made of a polyolefin, preferably polyethylene, polypropylene, or copolymers, terpolymers and derivatives thereof. The blow-up ratio is at least about 1.5, preferably at least about 2.0, and more preferably at least about 2.5. The TD tensile strength to MD tensile strength ratio of the microporous film is from about 0.1 to about 1.0, preferably from about 0.12 to about 1.0, more preferably from about 0.5 to about 1.0. Typically, the film has a Gurley value of from about 5 seconds to about 100 seconds, preferably from about 10 seconds to about 60 seconds, as measured by the ASTM-D726(B) method, and a shutdown temperature of from about 80° C. to about 160° C., preferably from about 90° C. to about 130° C., more preferably from about 100° C. to about 120° C. The tear strength in the transverse direction of the film is at least about 40 kgf/cm$^2$, preferably at least about 50 kgf/cm$^2$, more preferably at least about 60 kgf/cm$^2$, even more preferably at least about 70 kgf/cm$^2$, and most preferably at least about 80 kgf/cm$^2$, as measured by the method of ASTM D-1004.

In a preferred embodiment of the invention, a multi-layer shutdown battery separator is provided having one or more microporous shutdown layers each being sandwiched between two microporous strength layers. The microporous membrane of this invention is used as at least one of the microporous layers in the multi-layer battery separator.

In the multi-layer shutdown separator of this invention, different layers of the separator can be prepared separately and subsequently laminated together to form the multi-layer separator. Optionally, cross-plied separators can be provided wherein the microporous membranes are laminated such that the axis of one ply is angularly biased (preferably orthogonally) relative to the axis of another ply. Generally, cross-plied microporous membrane separators exhibit increased strength and puncture-resistance properties.

Alternatively, the multiple layers of the shutdown battery separator can be made by a co-extrusion process, in which all layers are extruded together and are subsequently annealed and stretched to form a multilayer separator.

The battery separator of the present invention exhibits substantially increased split-resistance characteristics, thus making the separator much easier to handle in both the separator production process and during the process of making a lithium battery using the separator. However, no extra components are added in the polymer resins for making the battery separator. In addition, the orientation in the transverse direction is achieved as a film precursor is extruded in the blown film extrusion process. No separate steps are required. Thus, the present invention provides battery separators with substantially improved mechanical properties without requiring additional materials and complex steps.

The foregoing and other advantages and features of the invention, and the manner in which the same are accomplished, will become more readily apparent upon consideration of the following detailed description of the invention taken in conjunction with the accompanying examples, which illustrate preferred and exemplary embodiments.

DETAILED DESCRIPTION OF THE INVENTION

The battery separator of this invention comprises a microporous membrane having improved split resistance.

As used herein, the term "microporous" means that the membrane has micropores normally with an average pore size of from about 0.005 to about 10 microns, preferably from about 0.01 to about 5 microns, and most preferably from about 0.05 to about 2 microns, and a Gurley value of from about 5 seconds to about 100 seconds, preferably from about 10 seconds to about 60 seconds, as measured by the method of ASTM-D726(B).

The microporous membrane of this invention is prepared by a process comprising the steps of a) preparing a membrane precursor by blown film extrusion at a blow-up ratio of at least 1.5; b) annealing the membrane precursor; and c) stretching the resultant annealed membrane precursor to form the microporous membrane. Methods for making microporous membranes useful for battery separators which include the steps of blown film extrusion, annealing, and stretching are disclosed in, e.g., U.S. Pat. Nos. 5,565,281 and 5,691,077, which are incorporated herein by reference. Typically, in these methods, a membrane precursor is extruded by a blown film extrusion process operated at a blow-up ratio of about 1. That is, there is no radial expansion in the tubular film extruded. The membrane precursor is then annealed, and uniaxially stretched in the machine direction to form a microporous membrane. However, the difference in the method of the present invention is that the blow-up ratio in the blown film extrusion step must be at least about 1.5, preferably at least about 2.0. It has been discovered that when the blow-up ratio in the extrusion process is increased to at least 1.5, the split resistance property of the resultant microporous film is greatly improved. While not wishing to be bound by any theory, it is believed that this is because the tensile strength in the TD direction is increased, and the microporous membrane becomes more isotropic in mechanical properties in the TD direction and MD direction. However, typically the blow-up ratio in the extrusion process used in this invention should not be too high, e.g., more than 20. When the blow-up ratio is too high, the stability of the tubular film formed during the blown film extrusion is deteriorated.

As used herein, the term "blown film process" or "blown film extrusion" means a polymer extrusion process, in which a polymer melt is extruded from an annular die into a tubular film (or parison) which is pulled away from the die and then collapsed or flattened using nip rolls or the like. As the tubular film is formed, a fluid such as air is continuously blown onto the tubular film. Thus, a bubble of air is trapped within the tubular film and between the die and the nip rolls. In addition, as the tubular film is pulled away from the die, air is blown around the film outside surface to stabilize and quench the tubular film from the exterior. Many conventional blown film process known in the art can be used in this invention with appropriate modification to achieve the blow-up ratio requirement of this invention.

As used herein, the term "blow-up ratio" means the ratio of the maximum diameter of the blown tubular film to the die diameter.

Any film-forming polymer suitable for making battery separators may be used for preparing the microporous membrane of this invention. Examples of such polymers include, but are not limited to polymers, copolymers and terpolymers based on, e.g., polyolefins, polysulfones, polyvinyl chloride, polyvinyl fluoride, polytetrafluoroethylene-polystyrene copolymers, polyamides, polyphenyleneoxide-polysterene copolymers, polycarbonates and the like. Typically, polymers should be chosen such that the battery separator, a microporous film, made therefrom exhibits a high degree of conductivity and is stable in the battery environment.

Preferably, polymers are chosen such that the microporous membrane exhibits the shutdown properties. Shutdown battery separators are well known in the art. A shutdown separator closes its micropores at a certain temperature, typically a temperature lower than the temperature that could cause thermal runaway in a lithium battery. Typically, polyolefins are used including, but not limited, polyethylene, polypropylene, or a blend consisting essentially of polypropylene and/or polyethylene or copolymers thereof. Polyethylenes such as low density polyethylene (LDPE), linear low density polyethylene (LLDPE), and high density polyethylene (HDPE) can all be used as the polymer. The polyolefins can have a molecular weight of from about 100,000 to about 5,000,000.

Preferably a polymer composition comprising substantially all polypropylene and/or polyethylene or copolymers thereof is used in this invention. The term "substantially all" is intended to mean that the polymer resin used in extrusion contains at least 80%, preferably at least 90%, and more preferably at least 95% by weight of polypropylene and/or polyethylene, or copolymers thereof. The polymer resin composition optionally may include antioxidants, additives, stabilizers, and processing aids as will be known to a skilled person in the art. Fillers may be added. However, the process in accordance with this invention employs an annealing step as described below to facilitate the formation of micropores. The annealing step obviates the need for including fillers in the polymer composition.

The polymer composition is extruded by a blown film extrusion process. Blown film extrusion is generally known in the art. A blown film extrusion process for extruding non-porous precursor layers for making battery separators which employs a blow-up ratio of one, is disclosed in, by way of non-limiting example, U.S. Pat. No. 5,691,077, which is incorporated herein by reference. The blown film extrusion in the present invention differs from that method in that a blow-up ratio of at least about 1.5 is required. Other conventional blown film processes can also be used in the present invention so long as the blow-up ratio of at least 1.5 is achieved upon appropriate modifications of such processes. Some minor degree of experimentation may be required in the modification, this being well within the capability of one skilled in the art once apprised of the present disclosure. Typically, the blow-up ratio in the blown film extrusion step must be at least about 1.5, preferably at least 2.0, and more preferably at least 2.5. However, the blow-up ratio should not be too high, e.g., more than 20. When the blow-up ratio is too high, the stability of the extruded tubular film may deteriorate.

Typically, the polymer and any additives are melted in an extruder and extruded into a tubular film in a molten condition through an annular extrusion (or coextrusion) die. The annular die can have a diameter of about 0.5 to about 50 inches and a die gap of about 0.030 to about 0.140 inch. As is known in the art, internal air or other fluid such as inert gases can be introduced through an inlet in the extruder into the interior of the tubular film. A shape imposing air ring can be used to direct air about the exterior of the extruded tubular film, and to provide air pressure against the outer surface of the tubular film. Both the internal air and the outside air allow the tubular film to be solidified at a predetermined distance from the die orifice. In addition, the pressure exerted by the internal air causes the radial expansion of the tubular film to a predetermined blow-up ratio. One or more air rings can be used. Air rings are generally known in the art and are disclosed in, e.g., U.S. Pat. No. 4,118,453, which is incorporated herein by reference. Air rings also serve to determine the shape of the tubular film. Preferably, one or more dual lip air rings are used. After the radial expansion and cooling, the tubular film is collapsed and flattened using a collapsing member such as nip rolls and the like.

As is known to a skilled artisan, for a given polymer resin, a number of factors are determinative of the blow-up ratio of the extruded film precursor, including, e.g., die orifice gap, extruder output speed, film haul-off (or draw) speed, the desired thickness of the film precursor, cooling ring shape, and the pressure exerted by the internal air and the pressure imposed by air or fluid blown from cooling rings, and the temperature of the air. Actual process parameters can be easily set by one skilled person in the art to achieve a desired blow-up ratio without undue experimentation.

After the extrusion, the non-porous film is annealed before further stretching. As generally known in the art, annealing is a heating process which improves the crystalline structure in the film precursor and facilitates the micropore formation during the stretching step. Annealing can be conducted by any conventional methods. For example, the film precursor can be contacted with a heated roll or a heated metal plate, or can be heated in air or an inert gas. Alternatively, the film precursor can be wound around a core and heated in a roll form in a gaseous phase. A release sheet such as polyethylene terephthalate films, fluorine resin films, and paper or plastic films coated with, e.g., silicone resin, may be used to prevent the blocking of the film in the roll form. Typically, annealing can be performed at a temperature of from about 100° C. to about 145° C., for a time period of from about 5 minutes to about 30 minutes.

The annealed film precursor is then stretched (or "oriented") to cause the formation of micropores in the structure of the film precursor. Typically, the annealed film precursor is uniaxially stretched in the machine direction, and optionally in the transverse direction as well. Stretching is generally known in the art, and is disclosed in e.g., U.S. Pat. No. 5,565,281 and U.S. Pat. No. 5,691,077, which are incorporated hereby by reference. Stretching can include several steps, e.g., a cold drawing step, a hot drawing step, and a relax or heat-treating step. The relax or heat-treating step is to reduce internal stress within the separator and may be accomplished with either negative draw ratio or substantially no draw tension at various heat profiles. Stretching can be a continuous process performed in ovens containing draw frame. The temperatures and draw ratios can be set by a skilled artisan without undue experimentation. After stretching, the microporous membrane can be wound up and slit to desired widths.

Typically, in a conventional tubular film extrusion process in which the blow-up ratio is 1, the film precursor is partially oriented even before the annealing step as a result of the difference in the thermal history and line speed during the blown film extrusion. Since there is no radial expansion in the tubular film precursor, orientation only occurs in the machine direction. The polymer film precursor exhibits a crystalline row structure in which lamellae are arranged in rows in the take-off direction. It is generally believed in the art that such a crystalline structure is important to the formation of desirable micropores in the subsequent annealing and stretching steps. It is also believed heretofore in the art that expansion of the blown film in the transverse direction would interfere with the micropore formation in the subsequent stretching step. However, it has been discovered in the present invention that, although the extruded film precursor is greatly expanded in the TD direction as a result of the increase in blow-up ratio, the resultant film precursor is still suitable for subsequent annealing and stretching operation and suitable micropores can still be formed.

Typically, in accordance with this invention, the single layer microporous membrane has a thickness of less than about 2 mils, preferably less than about 1.5 mils, more preferably less than about 1.25 mils, and most preferably less than about 1 mil. The micropores in the microporous membrane normally have an average pore size of from about 0.005 to about 10 microns, preferably from about 0.01 to about 5 microns, and most preferably from about 0.05 to about 2 microns. The microporosity of the microporous membrane of this invention is also demonstrated by a Gurley value of from about 5 seconds to about 100 seconds, preferably from about 10 seconds to about 60 seconds, 20 seconds to about 40 seconds, as measured by the ASTM-D726(B) method. Typically, when a shutdown separator is made in accordance with the present invention, the shutdown temperature is from about 80° C. to about 160° C., preferably from about 90° C. to about 130° C., more preferably from about 100° C. to about 120° C.

The tensile strength of the resultant microporous membrane in the machine direction and transverse direction can vary with different polymer materials used for making the membrane, and with the blow up ratio during the blown film extrusion. For example, in a microporous membrane of this invention made of polyethylene, the tensile strength in the MD direction is typically from 50 kpsi to about 100 kpsi, preferably from about 60 kpsi to about 80 kpsi, as measured by ASTM-D638. The tensile strength in the transverse direction is typically at least 15 kpsi, preferably at least 30 kpsi, as measured by ASTM-D638. The tensile strength ratio (TD tensile strength: MD tensile strength) is at least about 0.10, preferably at least about 0.12, more preferably at least about 0.25, and most preferably at least 0.5. However, typically the tensile strength ratio is typically no greater than about 1.2, preferably no more than about 1.0.

In a microporous membrane of this invention made of polypropylene, the tensile strength in the MD direction is typically from 80 kpsi to about 150 kpsi, preferably from about 100 kpsi to about 130 kpsi. The tensile strength in the transverse direction is typically at least 25 kpsi, preferably at least 50 kpsi. The tensile strength ratio (TD tensile strength: MD tensile strength) is from about 0.10 to about 1.2, preferably from about 0.12 to about 1.0, more preferably from about 0.25 to about 1, and most preferably from about 0.5 to about 1.0.

The split resistance property of the microporous membrane is demonstrated by the tear resistance in the transverse direction (TD mean resistance), which is at least about 40 kgf/cm$^2$, preferably at least about 50 kgf/cm$^2$, more preferably at least about 60 kgf/cm$^2$, even more preferably at least about 70 kgf/cm$^2$, and most preferably at least about 80 kgf/cm$^2$, as measured by the method of ASTM D-1004.

The puncture strength of microporous membrane is at least about 270 gm, preferably at least about 300 gm, and more preferably at least about 400 gm.

In a preferred embodiment, a multi-layer shutdown separator is provided having at least one shutdown layer and at least one strength layer. Typically the shutdown layer(s) are made of polyethylenes such as high density polyethylene (HDPE), low density polyethylene (LDPE), linear low density polyethylene (LLDPE), or a blend comprising substantially of HDPE, LDPE, LLDPE or a mixture thereof. An exemplary polyethylene is Fina HDPE 7208 resin commercially available from Fina Oil and Chemical Company, Dallas Tex. The strength layer(s) can be composed of, for example, a polyolefin such as polypropylene or a blend comprising substantially polypropylene or copolymer of polypropylene. An exemplary polypropylene is Fina PP 3271 resin commercially available from Fina Oil and Chemical Company, Dallas Tex.

The multi-layer shutdown separator according to this embodiment of the invention comprises at least one split resistant microporous membrane layer prepared according to this invention. For example, to provide a bilayer shutdown separator, one split resistant microporous membrane layer of this invention can be laminated and bonded to another layer of microporous membrane. One layer can be a shutdown layer and the other can be a strength layer. Preferably, both layers are split resistant microporous membranes prepared according to the present invention. The methods of laminating and bonding are generally known in the art and are disclosed in, e.g., U.S. Pat. No. 5,565,281, which is incorporated herein by reference. Suitable bonding methods for use in this invention include calendaring, adhering with adhesives, and welding. The application of adhesives may include: air atomizing; gravure/screen printing; hydraulic spraying; and ultrasonic spraying. The choice of adhesive and the rate of adhesive application must be chosen so that the separator's porosity is not adversely effected. The welding technique includes thermal welding and ultrasonic welding. The amount of energy for either welding procedure and the pattern of weld should be chosen so that the separator's porosity is not adversely effected. Preferably bonding is done by calendaring, with nips closed, at a temperature of at least 1° C. below the melting point of the inner shutdown layer, preferably at a temperature of at least 5° C. below the melting point of the shutdown layer.

Optionally, a cross-plied trilayer battery separator can be made by cross-ply laminating the microporous layers such that one layer is angularly oriented relative to another layer. Suitable methods of making cross-ply microporous battery separators are disclosed in, e.g., U.S. Pat. No. 5,667,911, which is incorporated herein by reference.

After bonding, the multi-layer shutdown battery separator can be rewound for use in the manufacture of batteries, particularly secondary lithium batteries, as is well known in the art. Alternatively, the single ply precursors can be laminated and bonded together to form a multi-layer battery separator precursor, which is subsequently annealed and stretched to form a multi-layer separator.

Multi-layer battery separators other than bi-layer separators, in which one or more layers are the microporous membrane of this invention can also be prepared in a similar manner in accordance with this invention. Such other types include, e.g., trilayer separator having two strength layers sandwiching one shutdown layer, and penta-layer separators with the first, third, and fifth layers being strength layers and the second and fourth layers being shutdown layers.

In another preferred embodiment, the multilayer separator of this invention can be prepared by a co-extrusion process, in which two or more, preferably all, layers of the separator are co-extruded simultaneously into a multi-ply precursor. Methods of co-extrusion by a blown film extrusion process for making a battery separator are generally known and are disclosed in, e.g., U.S. Pat. Nos. 5,240,655 and 5,281,491, both of which are incorporated herein by reference. However, the co-extrusion process for preparing the multilayer precursor in this invention requires that the blow-up ratio in the blown film extrusion is at least about 1.5, preferably at least about 2.0, more preferably at least about 2.5, and most preferably at least about 3.5. Annealing and stretching the co-extruded film precursor to form a multilayer battery separator can be conducted in a conventional method such as that disclosed in, e.g., U.S. Pat. No. 5,240,655, which is incorporated herein by reference.

This invention is further illustrated with reference to the examples set forth below. In the following example, Gurley is measured by the ASTM D-726(B) method. As used herein, Gurley is the resistance to air flow measured by the Gurley Densometer (e.g. Model 4120). The Gurley values set forth herein are expressed as the time in seconds required to pass 10 cc of air through one square inch of product under a pressure 12.2 inches of water.

The tensile strength along MD and TD is measured with the ASTM D-638 method. The tear resistance is measured by ASTM D-1004.

The thickness of the battery separator is measured by the T411 om-83 method developed under the auspices of the Technical Association of the Pulp and Paper Industry. Thickness is determined using a precision micrometer with a ½ inch diameter, circular shoe contacting the sample at seven (7) psi. Ten (10) individual micrometer readings taken across the width of the sample are averaged.

The porosity of a microporous film is measured by the method of ASTM D-2873.

Puncture strength is measured as follows: Ten measurements are made across the width of the stretched product and averaged. A Mitech Stevens LFRA Texture Analyzer is used. The needle is 1.65 mm in diameter with 0.5 mm radius. The rate of descent is 2 mm/sec and the amount of deflection is 6 mm. The film is held tight in the clamping device with a central hole of 11.3 mm. The displacement (in mm) of the film that was pierced by the needle was recorded against the resistance force (in gram force) developed by the tested film. The maximum resistance force is the puncture strength.

EXAMPLE

A polyethylene sheet product is formed by extruding the high density polyethylene resin HDPE Hizex 5202B, which is commercially available from Mitsui Petrochemical LTD, White Plains, NY. The extruder equipment was configured as set forth in TABLE 1.

Brampton 3" 3 Layer Pilot Line

TABLE 1

Extruder Configuration

| Blow-up Ratio | 1.0 | 1.5 | 2.0 | 2.5 |
|---|---|---|---|---|
| L/D Ratio | 24:1 | 24:1 | 24:1 | 24:1 |
| Barrel Size | 3" | 3" | 3" | 3" |
| Die Size | 27" | 27" | 27" | 27" |
| Die Gap | 50 mil | 50 mil | 79.6 mil | 79.9 mil |
| Land length | 1.5" | 1.5" | 1.5" | 1.5" |
| Air Ring | Dual Lip | Dual Lip | Dual Lip | Dual Lip |

The blown film extrusion was conducted under conditions summarized in TABLE 2.

TABLE 2

Extrusion Conditions

| Blow-up Ratio | 1.0 | 1.5 | 2.0 | 2.5 |
|---|---|---|---|---|
| Melt Temp (° C.) | 210 | 210 | 210 | 210 |
| Die Temp (° C.) | 220 | 220 | 220 | 220 |
| Upper Nip (Line) Speed (fpm) | 60 | 94 | 105 | 117.8 |
| Weighted Gauge (mil) | 1.36 | 1.33 | 1.3 | 1.3 |
| Trace | .26 | .26 | .27 | .32 |
| Air Ring Opening (inch) | 0.080 | 0.080 | 0.080 | 0.080 |
| Air Ring Frost Line (inch) | 6" | 6" | 16" | 16" |
| Bire fringence | .0266 | 0.0131 | 0.0148 | .0120 |
| Quenching Air Pressure (inch $H_2O$) | 3 | 3 | 3 | 3 |

The extruded films were annealed and stretched under conditions summarized in TABLE 3 and TABLE 4 respectively.

TABLE 3

Annealing Conditions

| Blow-up Ratio | 1.0 | 1.5 | 2.0 | 2.5 |
|---|---|---|---|---|
| Temp (° C.) | 120 | 120 | 120 | 120 |
| Line Speed (fpm) | 30 | 30 | 30 | 30 |
| Residence Time (min) | 15 | 15 | 15 | 15 |
| % Stretch | 7% | 7% | 7% | 7% |

TABLE 4

Stretching Conditions

| Blow-up Ratio | 1.0 | 1.5 | 2.0 | 2.5 |
|---|---|---|---|---|
| Zone 1 Temp (° C.) (cold stretch) | 25 | 25 | 25 | 25 |
| Zone 2 Temp (° C.) (hot stretch) | 90 | 90 | 90 | 90 |
| Zone 3 Temp (° C.) (hot stretch) | 90 | 90 | 90 | 90 |
| Zone 4 Temp (° C.) (relax) | 90 | 90 | 90 | 90 |
| Line speed (fpm) | 20 | 20 | 20 | 20 |
| Cold Stretch* (%) | 40 | 40 | 40 | 40 |
| Hot Stretch* (%) | 145 | 145 | 145 | 145 |
| Relax* (%) | 30 | 30 | 30 | 30 |
| Total Stretch (%) | 100 | 100 | 100 | 100 |

*Based on incoming line speed

The basic properties for the stretched films are provided in TABLE 5.

TABLE 5

| Blow-up Ratio | 1.0 | 1.5 | 2.0 | 3.5 |
|---|---|---|---|---|
| Normalized Gurley (sec/mil) | 34 | 37 | 57 | 60 |
| Puncture strength (g) | 280 | 270 | 260 | 240 |
| MD mean tear resistance ($kgf/cm^2$) | 211.73 | 186.9 | 175.49 | 176.89 |
| TD mean tear resistance ($kgf/cm^2$) | 43.27 | 51.78 | 63.06 | 78.84 |
| TD/MD tensile strength ratio | 0.111 | 0.120 | 0.128 | 0.135 |

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, it will be obvious that certain changes and modifications may be practiced within the scope of the appended claims.

What is claimed is:

1. A microporous membrane comprising a microporous membrane having at least 80% by weight of a polymer selected from the group consisting of polypropylene, polyethylene, and a copolymer thereof, and having a tear resistance in the transverse direction of at least about 50 $kgf/cm^2$, said membrane being a single layer or a co-extruded multi-layer membrane.

2. The microporous membrane of claim 1, wherein said tear resistance in the transverse direction is at least about 60 $kgf/cm^2$.

3. The microporous membrane of claim 1 having a ratio between the tensile strength in the transverse direction and the tensile strength in the machine direction of at least about 0.120.

4. The microporous membrane of claim 1 having a Gurley value of less than about 100 seconds.

5. The microporous membrane of claim 1, wherein said polymer is a high density polyethylene.

6. A multi-layer shutdown separator comprising a microporous membrane according to claim 1.

7. A microporous membrane comprising a microporous membrane having at least about 80% of polyethylene and having tear resistance in the transverse direction of at least about 50 $kgf/cm^2$, a ratio between the tensile strength in the transverse direction and the tensile strength in the machine direction of at least about 0.120, and a Gurley value of less than about 100 seconds, said membrane being a single layer or a co-extruded multi-layer membrane.

8. A multi-layer shutdown separator comprising a microporous membrane according to claim 7.

9. A microporous membrane which comprises at least 80% by weight of a polymer selected from the group consisting of polypropylene, polyethylene, and a copolymer thereof, said microporous membrane being a single layer or a co-extruded multi-layer membrane and being prepared by a process comprising:
   extruding a film precursor by a blown film method at a blow-up ratio of at least about 1.5;
   annealing said film precursor; and
   stretching the resultant annealed film precursor to form said microporous membrane.

10. The microporous membrane of claim 9, wherein said blow-up ratio is at least about 2.0.

11. The microporous membrane of claim 10, wherein the film precursor comprises of at least 80% by weight high density polyethylene.

12. The microporous membrane of claim 9, wherein said microporous membrane has a transverse direction tensile strength to machine direction tensile strength ratio of at least about 0.12.

13. A multi-layer shutdown separator comprising a microporous membrane according to claim 12.

14. The microporous membrane of claim 9, wherein said step of stretching comprises uniaxially stretching the annealed film precursor in the machine direction.

15. A multi-layer shutdown separator comprising a microporous membrane according to claim 9.

16. A method for preparing a microporous membrane having at least 80% by weight of a polymer selected from the group consisting of polypropylene, polyethylene, and a copolymer thereof, and having a tear resistance in the transverse direction of at least about 50kgf/cm$^2$, said membrane being a single layer or co-extruded multi-layer membrane and suitable for use as a battery separator, comprising the steps of:

extruding a film precursor by a blown film method at a blow-up ratio of at least 1.5;

annealing said film precursor; and stretching the resultant annealed film precursor to form said microporous membrane.

17. The method of claim 16, wherein said microporous membrane comprises at least about 80% by weight of high density polyethylene.

18. The method of claim 16, wherein said blow-up ratio is at least 2.0.

19. The method of claim 16, wherein said microporous membrane has a Gurley value of less than about 100 seconds.

20. The method of claim 16, wherein said microporous membrane has a ratio between the tensile strength in the transverse direction and the tensile strength in the machine direction of at least about 0.120.

* * * * *